Oct. 20, 1925.
C. O. GUSTAVSEN
MACHINE FOR ROLLING GEARS
Filed Dec. 23, 1922
1,558,086
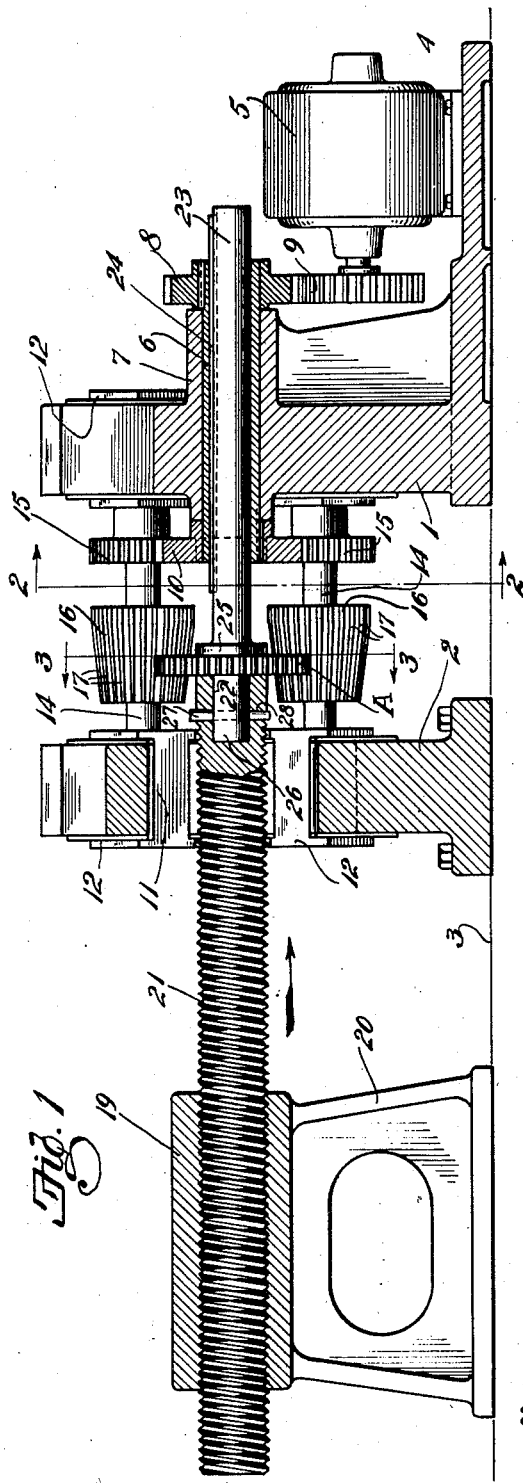
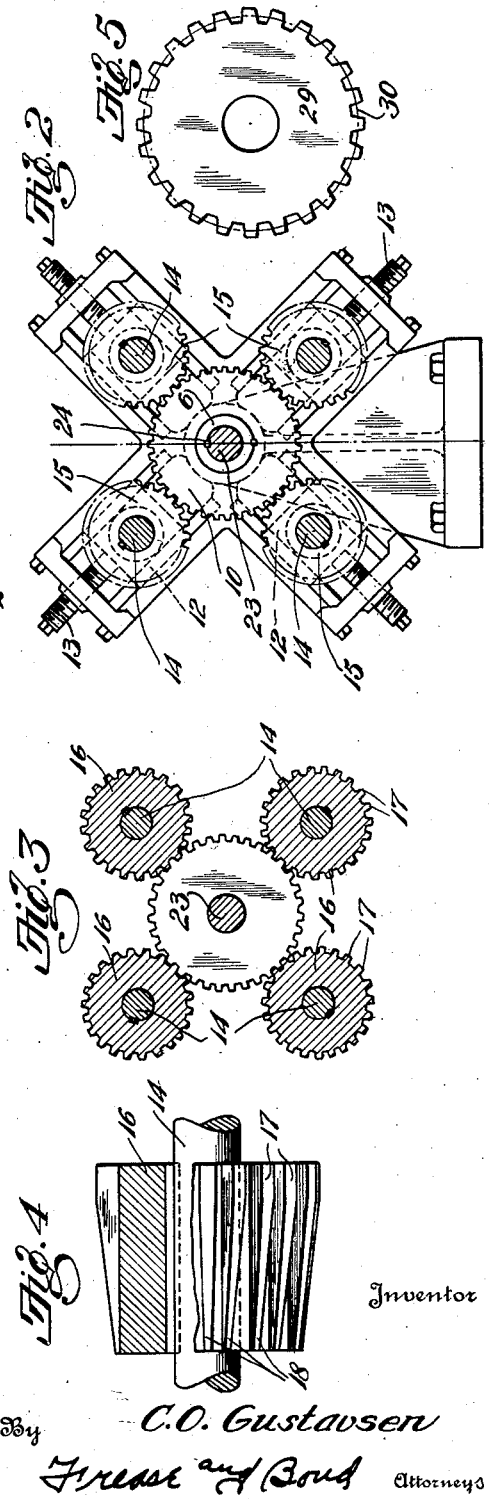
Inventor
C. O. Gustavsen
By Frease and Bond Attorneys Patented Oct. 20, 1925.

1,558,086

UNITED STATES PATENT OFFICE.

CHARLES O. GUSTAVSEN, OF CANTON, OHIO.

MACHINE FOR ROLLING GEARS.

Application filed December 23, 1922. Serial No. 608,655.

*To all whom it may concern:*

Be it known that I, CHARLES O. GUSTAVSEN, a citizen of the United States, residing at Canton, in the county of Stark and State of Ohio, have invented a new and useful Machine for Rolling Gears, of which the following is a specification.

This invention relates to a method of and a machine for rolling gears and has for its objects to provide means whereby a heated blank of proper dimensions is rotated upon its axis and passed axially between a plurality of forming rolls which are rotated in unison and co-ordinated in movement to form finished gear teeth upon the blank as it is passed through the machine.

The above and other objects may be attained by performing the method upon a machine constructed in the manner illustrated in the accompanying drawing, in which—

Figure 1 is a longitudinal, sectional view through a machine constructed in accordance with the invention;

Fig. 2, a section on the line 2—2, Fig. 1;

Fig. 3, a section on the line 3—3, Fig. 1;

Fig. 4, a detail view partly in section, of one of the forming rolls; and

Fig. 5, a plan view of a finished gear.

Similar numerals of reference indicate corresponding parts throughout the drawing.

The machine to which the invention pertains includes a pair of spaced frame members 1 and 2, secured in any approved manner to a table, floor or other stationary support, as indicated at 3, the frame 1, preferably including a rearwardly extending base 4, upon which a motor 5, for furnishing power to the machine, may be mounted.

A tubular shaft 6 is journaled through a central bearing 7 in the frame 1 and a gear 8 is fixed upon the rear end of said shaft and meshes with the gear 9 upon the shaft of the motor 5. A master gear 10 is fixed upon the forward end of the tubular shaft 6, the two gears 8 and 10 upon said shaft abutting opposite ends of the bearing 7 and preventing longitudinal movement of the tubular shaft within the bearing.

The frame 2 is provided with an enlarged central opening 11, axially aligned with the tubular shaft 6 and each of the frames 1 and 2 is provided with a plurality (preferably 4 as shown) of adjustable bearings 12 arranged to be adjusted radially toward and from the axis of the shaft 6 and opening 11, as by means of the adjusting screws 13.

Shafts 14 are journaled at opposite ends in the adjustable bearings 12 of the frames 1 and 2 and gears 15 are fixed upon the rear end portions of said shafts and mesh with the master gear 10, the adjustable bearings 12 being moved inward by means of the adjusting screws 13 to hold the gears 15 in mesh with the master gear, as shown in Figs. 1 and 2.

A forming roll 16 is fixed upon each of the shafts 14, said forming rolls being of substantially the diameter of the gears 15 and provided with longitudinal ribs 17 of the same cross sectional shape as gear teeth, said ribs being tapered in thickness and width toward the forward ends of the rolls, as indicated at 18.

An internally threaded bearing 19 is spaced from the forward side of the frame 2 and is fixedly supported upon the bracket 20 in axial alignment with the hollow shaft 16 and central opening 11 of the frame 2. A screw 21 is mounted in the threaded bearing 19 and provided at its rear end with the axial socket 22.

An arbor 23 is splined through the hollow shaft 6 as shown at 24, a shoulder 25 being formed near the forward end thereof, the projecting forward end 26 of the arbor being arranged to be inserted into the socket 22 of the screw 21, a pin 27 or the like being arranged to be passed through a transverse opening 28 in the screw and a similar opening in the forward end portion of the arbor.

In operating the machine to form a gear, a heated circular blank of substantially the diameter of the pitch line of the gear to be formed, is placed upon the forward end 26 of the arbor 23, abutting the shoulder 25, the arbor being first pulled forwardly through the hollow shaft 6 until the forward end thereof protrudes through the opening 11 in the frame 2.

The end 26 of the arbor is then inserted in the socket 22 of the screw 21, and the pin 27 placed through the transverse openings in the screw openings, locking the same together. The motor 5 is then started, rotating the hollow shaft 6 and with it the arbor 23, which in turn rotates the screw 21 in its threaded bearing 19, feeding the same rearwardly in the direction of the arrow shown in Fig. 1.

The rolls 16 will all be rotated in unison at the same time, and the blank which is rotated in the opposite direction to said rolls will be at the same time moved axially between the rolls, engaging first the tapered ends of the ribs 18 and being moved gradually toward the wider ends of said ribs, which will roll the teeth in the peripheral surface of the blank, the metal displaced from or beneath the pitch line in the blank, being forced outward to form the teeth upon the finished gear, which is shown at 29 in Fig. 5, the pitch line of the gear, which is the diameter of the blank, being shown by a dotted line at 30 in said figure.

The partly completed blank is indicated at A in Fig. 1 as it is passing between the forming rolls. As the blank A reaches the rear end portions of the forming rolls, the motor is stopped and then reversed, carrying the blank back through the forming rolls and out through the central opening 11 of the frame 2, when the motor is stopped and the pin 27 removed, in order that the arbor may be supported from the screw and the formed gear removed therefrom.

This gear is then pickled to remove all scale and oxidization formed thereon by heat, after which the gear is cold rolled through a machine constructed in the manner of the one above described, producing a polished finish upon the teeth of the gear.

Although the machine as illustrated and described is shown constructed to form spur gears, it should be understood that any other form of gear such as spiral gears, bevel gears and the like may be produced in the same manner by changing the shape of the forming rolls to produce the desired shape of gear.

It will also be seen that gears of various diameters may be formed upon the same machine by changing the master gear 10 and adjusting the shafts 14 in order that the gears 15 thereon will mesh with the master gear, the same forming rolls 16 being used for gears of any size having the same pitch. When it is desired to form a gear of a different pitch, it is often necessary to change the forming rolls, replacing the same with rolls of the proper pitch.

Although certain details of construction are shown in the form of the machine illustrated, it will be understood that numerous changes in the details of the machine may be made without departing from the invention, which consists broadly in providing means for rotating the heated blank and passing the same axially between a plurality of forming rolls having peripheral surfaces shaped to roll gear teeth upon the peripheral surface of the blank.

I claim:—

1. A machine for rolling gears including a plurality of forming rolls, means for rotating said rolls and means for passing a heated blank axially between said rolls and means for positively rotating the blank in unison with the rolls.

2. A machine for rolling gears including a plurality of forming rolls, means for rotating said rolls and positive means for rotating a heated blank in the opposite direction and passing the same between said rolls.

3. A machine for rolling gears including a plurality of forming rolls, means for positively rotating said rolls and means for rotating a heated blank and passing the same axially between said rolls.

4. A machine for rolling gears including a plurality of forming rolls provided with longitudinal ribs tapered toward their forward ends and means for positively rotating a heated blank and passing the same axially between said rolls.

5. A machine for rolling gears including a plurality of forming rolls provided with longitudinal ribs tapered toward their forward ends, and means for positively rotating a heated blank and passing the same between said rolls.

6. A machine for rolling gears including a plurality of forming rolls provided with longitudinal ribs tapered toward their forward ends, means for rotating said rolls in unison and means for positively rotating a heated blank in the opposite direction and passing the same between said rolls.

7. A machine for rolling gears including a plurality of forming rolls provided with longitudinal ribs tapered toward their forward ends, means for rotating said rolls in unison, and means for positively rotating a heated blank in the opposite direction and passing the same axially between said rolls.

8. A machine for rolling gears including a plurality of forming rolls, a pinion upon the shaft of each roll, a master gear meshing with said pinions, means for driving the master gear and means for passing a heated blank axially between the rolls and means for positively rotating the blank in unison with the rolls.

9. A machine for rolling gears including a plurality of forming rolls, a pinion upon the shaft of each roll, a master gear meshing with said pinions, means for driving the master gear and means for positively rotating a heated blank in the same direction as the master gear and passing the same axially between the rolls.

10. A machine for rolling gears including an arbor, means for attaching a heated blank thereto, a plurality of forming rolls surrounding the arbor, means for rotating the forming rolls and means for moving the arbor axially and means for positively rotating the arbor in unison with the rolls.

11. A machine for rolling gears including an arbor, means for attaching a heated blank thereto, a plurality of forming rolls surounding the arbor, means for rotating the rolls in one direction, and means for positively rotating the arbor in the opposite direction.

12. A machine for rolling gears including an arbor, means for attaching a heated blank thereto, a plurality of forming rolls surrounding the arbor, means for rotating the rolls in one direction, positive means for rotating the arbor in the opposite direction and means for moving the arbor axially.

In testimony that I claim the above, I have hereunto subscribed my name.

CHARLES O. GUSTAVSEN.